US009963521B2

(12) United States Patent
Wettling et al.

(10) Patent No.: US 9,963,521 B2
(45) Date of Patent: May 8, 2018

(54) PROCESS FOR PREPARING HIGHER MOLECULAR WEIGHT POLYISOBUTYLENE

(71) Applicant: BASF SE, Ludwigshafen (DE)

(72) Inventors: Thomas Wettling, Limburgerhof (DE); Stefan Hirsch, Neustadt (DE); Markus Brym, Limburgerhof (DE); Markus Weis, Roemerberg (DE); Rosa Corberan Roc, Mannheim (DE); Klaus Muehlbach, Gruenstadt (DE); Robert Haschick, Mannheim (DE); Andreas Daiss, Ludwigshafen (DE); Marco-Christian Volland, Neuhofen (DE)

(73) Assignee: BASF SE, Ludwigshafen (DE)

( * ) Notice: Subject to any disclaimer, the term of this patent is extended or adjusted under 35 U.S.C. 154(b) by 55 days.

(21) Appl. No.: 13/765,031

(22) Filed: Feb. 12, 2013

(65) Prior Publication Data

US 2013/0217847 A1 Aug. 22, 2013

Related U.S. Application Data

(60) Provisional application No. 61/599,953, filed on Feb. 17, 2012.

(51) Int. Cl.
*C08F 110/10* (2006.01)
*C08F 4/52* (2006.01)
*C08F 4/70* (2006.01)

(52) U.S. Cl.
CPC .................. *C08F 4/52* (2013.01); *C08F 4/70* (2013.01); *C08F 110/10* (2013.01)

(58) Field of Classification Search
CPC ...... C08F 4/14; C08F 4/52; C08F 4/70; C08F 4/80; C08F 110/10; C08F 10/10; C08F 210/10
USPC ....................... 526/135, 208, 209, 237, 348.7
See application file for complete search history.

(56) References Cited

U.S. PATENT DOCUMENTS

| 2,559,062 | A | * | 7/1951 | Dornte | 526/172 |
| 3,808,187 | A | | 4/1974 | Steigerwald et al. | |
| 5,102,958 | A | * | 4/1992 | Hous | C08F 8/20 525/332.8 |
| 2006/0089467 | A1 | * | 4/2006 | McDonald et al. | 526/124.3 |
| 2006/0108703 | A1 | * | 5/2006 | Uchiumi | B29B 9/06 264/85 |
| 2010/0286346 | A1 | * | 11/2010 | Muhle | C08F 10/02 526/60 |
| 2013/0041121 | A1 | | 2/2013 | König et al. | |

FOREIGN PATENT DOCUMENTS

| DE | 2 061 289 | | 6/1972 |
| DE | 33 32 629 | A1 | 3/1985 |
| EP | 154164 | A2 * | 9/1985 |
| JP | 2004-506088 | A | 2/2004 |
| JP | 2009-511690 | A | 3/2009 |
| WO | WO 02/16452 | A1 | 2/2002 |
| WO | WO 2007/042516 | A1 | 4/2007 |
| WO | WO 2007/113196 | A1 * | 10/2007 |
| WO | WO 2012/072643 | A2 | 6/2012 |

OTHER PUBLICATIONS

EP 154164 A2, Sep. 1985, machine translation.*
Machine translation of WO 2007/113196 A1, Oct. 2007.*
U.S. Appl. No. 13/655,839, filed Oct. 19, 2012, Koenig, et al.
U.S. Appl. No. 13/735,385, filed Jan. 7, 2013, Wettling, et al.
Japanese Office Action dated Dec. 12, 2016 in Patent Application No. 2014-557050 (English translation only).

* cited by examiner

*Primary Examiner* — Roberto Rabago
(74) *Attorney, Agent, or Firm* — Oblon, McClelland, Maier & Neustadt, L.L.P.

(57) ABSTRACT

Preparation of isobutene homopolymers having a weight-average molecular weight of 75 000 to 10 000 000 by polymerization of isobutene, by (a) performing the polymerization at −80° C. to −190° C.,
(b) using, as an inert solvent, optionally halogenated $C_1$ to $C_5$ hydrocarbons,
(c) using, as a polymerization catalyst, a Lewis acid complex,
(d) performing the polymerization in the presence of at least one reaction accelerator in the form of an ethylenically saturated hydrocarbon compound comprising one oxygen atom and no abstractable proton, and
(e) performing the polymerization in the presence of at least one chain length regulator comprising one tertiary olefinic carbon atom.

17 Claims, No Drawings

PROCESS FOR PREPARING HIGHER MOLECULAR WEIGHT POLYISOBUTYLENE

The present invention relates to an improved process for preparing isobutene homopolymers having a weight-average molecular weight of 75 000 to 10 000 000 by polymerization of isobutene in the liquid phase in an inert solvent in the presence of a polymerization catalyst based on Lewis acids.

Efficient preparation processes which satisfy the specification for higher molecular weight polyisobutenes generally entail very low polymerization temperatures. A typical process for preparing higher molecular weight polyisobutenes is called the "BASF belt process", in which liquid isobutene together with boron trifluoride as a polymerization catalyst and a high excess of liquid ethene are passed onto a continuous steel belt of width from 50 to 60 cm, which is configured in a trough shape by suitable guiding and is present in a gas-tight cylindrical casing. Constant evaporation of the ethene at standard pressure sets a temperature of −104° C. This fully removes the heat of polymerization. The evaporated ethene is collected, purified and recycled. The resulting polyisobutenes are freed of ethene which still adheres and residual monomers by degassing. The polymerization of this type leads to virtually full isobutene conversion.

In the BASF belt process, the polymerization temperature can be controlled easily and reliably owing to evaporative cooling, i.e. as a result of formation of large vapor passages. However, a disadvantage of the BASF belt process is that, owing to lack of movement of the reaction material on the belt, inadequate mixing of the reaction material and hence no product surface renewal takes place, which can have a disadvantageous effect on the product properties. This leads, for example, to inhomogeneous distribution of the ethene used for evaporative cooling and associated local overheating of the reaction mixture as soon as the ethene has vaporized. In addition, there may be explosive boiling of the reaction mixture when overheated regions and ethene-rich cold regions come into contact with one another, which then leads to soiling of the reactor wall as a result of entrainment of polymerizing reaction mixture. Another disadvantage is that the inhomogeneous temperature distribution causes unwanted broadening of the molecular weight distribution of the polymer, which is associated with unfavorable product properties. A further disadvantage of the BASF belt process is that the steel belt is subject to wear and thus causes high maintenance costs. A further disadvantage of the BASF belt process is that the reactor walls and the product intake in the downstream workup section (usually an extruder) are not cooled; since polyisobutylene is highly tacky above its glass transition temperature, this leads to significant coverage of the reactor walls with sticky polymer, which necessitates an increased level of cleaning. A further disadvantage of the BASF belt process is that boron trifluoride present in the recycled ethene stream is highly corrosive at relatively high temperatures, which causes a high level of maintenance in the ethene workup circuit.

A further customary process for preparing higher molecular weight polyisobutenes is the "Exxon slurry process", in which the polymerization is performed at −80 to −85° C. in a stirred tank equipped with a cooling jacket which is charged with liquid ethene. The catalyst system used is anhydrous aluminum chloride in methyl chloride. Owing to the very vigorous stirring, the polymer is obtained as a slurry consisting of small droplets which flows via an intermediate vessel into a degassing vessel. Here, the slurry is treated with steam and hot water so that the volatile constituents (essentially unconverted isobutene and methyl chloride) can be removed and sent to reprocessing. The remaining liquid slurry of the polymer particles is worked up by removing catalyst residues, solvent residues and isobutene residues.

In the Exxon slurry process, although intensive mixing and product surface renewal takes place, the polymerization temperature is difficult to control solely by the jacket cooling. Since the polymer cannot completely be prevented from adhering to the reactor and apparatus walls, reactor and apparatus have to be cleaned from time to time.

The BASF belt process and the Exxon slurry process are described in detail in Ullmann's Encyclopedia of Industrial Chemistry, 5th edition, Vol. A21, pp. 555-561, under "polyisobutylenes".

It was an object of the present invention to provide an easily performable, efficient and economically viable process for preparing higher molecular weight isobutene homopolymers, which, with regard to the product parameters to be established, such as molecular weight, polydispersity and residual monomer content, allows reliable control of the polymerization and affords an easily purifiable and efficiently manageable product, in particular one which does not stick prior to workup. Due to the comparatively intense mixing of the reaction mixture, the polymerization should be performed in a customary closed reactor and in the disperse phase in an immiscible fluid or mixed homogeneously in a miscible fluid, i.e. in a suitable solvent or diluent.

The polymerization of isobutene to give higher molecular weight isobutene homopolymers in customary closed reactors in solvents or diluents is also known from other documents as well as the Exxon slurry process described. For instance, DE-A 2 061 289 discloses an isobutene polymerization process in which isobutene is polymerized between 0° C. and −160° C. in an inert diluent such as ethylene, methane, ethane or propane by means of boron trifluoride as a catalyst in the presence of a solution of formaldehyde in an alcohol such as isobutanol as a molecular weight regulator in a reaction flask to give higher molecular weight polyisobutene.

In the monograph "Polymerization and Polycondensation Processes, Advances in Chemistry Series 34" (1961), J. P. Kennedy and R. M. Thomas describe, in their article "Cationic Polymerization at Ultralow Temperatures", on pages 111-119, the polymerization of isobutene in a propane-isopentane mixture in a cooled reactor at −30° C. to −190° C. by means of an aluminum trichloride catalyst to give higher molecular weight polyisobutene. Aluminum trichloride has the disadvantage that, as a nonvolatile catalyst, it complicates the subsequent purification of the polyisobutene. Reaction accelerators or chain length regulators are not used.

The literature article "Fundamental Studies on Cationic Polymerization IV—Homo- and Co-polymerizations with Various Catalysts" by J. P. Kennedy and R. G. Squires in Polymer 6, pages 579-587, 1965 discloses that isobutene can be polymerized under boron trifluoride catalysis in alkyl chloride solvents at −30° C. to −146° C. in the presence of isoprene to give higher molecular weight polyisobutene. Reaction accelerators are not used.

The object of the present invention is achieved by a process for preparing isobutene homopolymers having a weight-average molecular weight of 75 000 to 10 000 000 by polymerization of isobutene in the liquid phase in an inert solvent in the presence of a polymerization catalyst based on Lewis acids, which comprises, in a polymerization reactor, at the same time (a) performing the polymerization at temperatures of −80° C. to −190° C.,
(b) using, as an inert solvent, one or more $C_1$ to $C_8$ hydrocarbons or one or more halogenated $C_1$ to $C_8$ hydrocarbons or a mixture thereof and
(c) using, as a polymerization catalyst, a Lewis acid complex based on boron trifluorid, on iron halides, on aluminum trihalides or on aluminum alkyl halides or a Lewis acid in combination with organic sulfonic acids as initiators, and additionally
(d) performing the polymerization in the presence of at least one reaction accelerator in the form of an ethylenically saturated hydrocarbon compound comprising at least one oxygen atom and no abstractable proton, and/or
(e) performing the polymerization in the presence of at least one chain length regulator comprising at least one tertiary olefinic carbon atom.

In a preferred embodiment, measures (d) and (e) are both performed.

In the context of the present invention, isobutene homopolymers are understood to mean those polymers which, based on the polymer, are composed of isobutene to an extent of at least 98 mol %, preferably to an extent of at least 99 mol %.

For the use of isobutene, or of the isobutenic monomer mixture as the monomer to be polymerized, suitable isobutene sources are, more particularly, pure isobutene which generally comprises at most 0.5% by volume of residual impurities such as 1-butene, 2-butenes, butane, water and/or $C_1$- to $C_4$-alkanols. However, it is also possible in principle to use isobutenic technical $C_4$ hydrocarbon streams, for example, $C_4$ raffinates, $C_4$ cuts from isobutane dehydrogenation, $C_4$ cuts from steamcrackers and from FCC crackers (fluid catalyzed cracking), provided that they have been substantially freed of 1,3-butadiene present therein. Suitable technical $C_4$ hydrocarbon streams comprise generally less than 500 ppm, preferably less than 200 ppm, of butadiene. The isobutene from such technical $C_4$ hydrocarbon streams is polymerized here substantially selectively to the desired isobutene homopolymer without incorporation of significant amounts of other $C_4$ monomers into the polymer chain. Typically, the isobutene concentration in the technical $C_4$ hydrocarbon streams mentioned is in the range from 40 to 60% by weight. However, the process according to the invention can in principle also be operated with isobutenic $C_4$ hydrocarbon streams which comprise less isobutene, for example, only 10 to 20% by weight. The isobutenic monomer mixture may comprise small amounts of contaminants such as water, carboxylic acids or mineral acids without any critical yield or selectivity losses. It is appropriate to the purpose to avoid accumulation of these impurities by removing such harmful substances from the isobutenic monomer mixture, for example, by adsorption on solid adsorbents such as activated carbon, molecular sieves or ion exchangers.

The Lewis acid complexes which are to be used as a polymerization catalyst according to measure (c) and are based on iron halides, on aluminum trihalides or on aluminum alkyl halides, and Lewis acids which are to be used as a polymerization catalyst in combination with organic sulfonic acids as initiators, are described in detail in WO 2012/072643 A2, explicit reference being made here thereto. The iron halide, aluminum trihalide and aluminum alkyl halide complexes mentioned comprise, as well as the Lewis acid, a donor in the form of an organic compound having at least one ether function or a carboxylic ester function. This combination of Lewis acids, especially of boron trifluoride, iron halides, aluminum trihalides or aluminum alkyl halides, with organic sulfonic acids as initiators comprise at least one organic sulfonic acid of the general formula $Z—SO_3H$ in which Z is a $C_1$-$C_{20}$-alkyl radical, $C_1$-$C_{20}$-haloalkyl radical, $C_5$-$C_8$-cycloalkyl radical, $C_6$-$C_{20}$-aryl radical or a $C_1$-$C_{20}$-aralkyl radical; a typical organic sulfonic acid of this kind is methanesulfonic acid.

According to measure (c), the polymerization catalyst used, however, is preferably a complex of boron trifluoride and a proton source. Suitable proton sources of this kind, which assume the function of an activator or moderator in the catalyst complex, are in particular ethers, especially $C_1$- to $C_4$-dialkyl ethers such as diethyl ether, and alcohols, especially low molecular weight monohydric aliphatic alcohols. In a particularly preferred embodiment, the polymerization catalyst used is a complex of boron trifluoride and a $C_1$- to $C_3$-alkanol, e.g. methanol, ethanol, n-propanol or isopropanol. The proton sources used may also be mixtures of the ethers and/or alcohols mentioned.

The boron trifluoride and the proton source may be premixed and added to the polymerization reactor already as an active complex. Alternatively, however, the boron trifluoride [in gaseous or liquid form or in an inert solvent or diluent, for example dissolved in an inert solvent according to measure (b)] and the proton source may also be supplied separately to the polymerization medium.

The amount of polymerization catalyst to be used is guided substantially by the type of catalyst and by the reaction conditions, especially the reaction temperature and the desired molecular weight of the polymer. It can be determined on the basis of a few sample tests for the respective reaction system. In general, the polymerization catalyst is used in amounts of 0.0001 to 1% by weight, especially 0.0005 to 0.5% by weight, in particular 0.001 to 0.1% by weight, based in each case on the Lewis acid content or boron trifluoride content in the catalyst complex and on isobutene used.

The proton source can be used in a substoichiometric, stoichiometric or superstoichiometric amount in relation to the boron trifluoride. Typical molar ratios of proton source to boron trifluoride are in the range from 0.3:1 to 3:1, especially 0.5:1 to 2:1, in particular 0.7:1 to 1.3:1 (based in each case on one proton equivalent of the proton source). Just like the amount of reaction accelerator according to measure (d) and of chain length regulator according to measure (e), it is also possible for the amount of proton source according to measure (c) to influence the establishment of the molecular weight to be achieved in the isobutene homopolymer and also to serve for controlled establishment of the molecular weight thereof.

The isobutene homopolymers prepared by the process according to the invention preferably have a weight-average molecular weight ($M_w$) of 150 000 to 8 000 000, especially of 250 000 to 6 000 000, in particular of 400 000 to 5 000 000. Alternatively, they preferably have a number-average molecular weight ($M_n$) (determined by gel permeation chromatography) of 25 000 to 2 000 000, more preferably of 45 000 to 1 500 000, especially of 55 000 to 1 000 000, in particular of 65 000 to 750 000.

In general, the isobutene homopolymers prepared by the process according to the invention have a polydispersity (PDI=$M_w/M_n$) of 2 to 20, especially of 3 to 15, in particular of 5 to 10.

According to measure (a), the polymerization process according to the invention is performed in the liquid polymerization medium at temperatures of −80° C. to −190° C. In a preferred embodiment, it is performed at temperatures close to the lower limit of the abovementioned temperature range, specifically at −130° C. to −190° C., in particular at less than −160° C. to −185° C., especially at −165° C. to −180° C., in a typical procedure at −168° C. to −173° C. In an alternative preferred embodiment, the process is performed at temperatures of −100° C. to −150° C., preferably at −105° C. to −147° C., in particular at −110° C. to −140° C., especially at −115° C. to −135° C., in a typical procedure at −120° C. to −130° C. The controlled low polymerization temperatures have an advantageous effect on the product properties. The temperature establishment in the precooling of the starting materials used, especially of the isobutene, can under some circumstances likewise influence the course of the polymerization and the results achieved; the isobutene to be used is cooled typically to temperatures of −70° C. to −140° C., especially to −70° C. to −100° C.

The reaction medium is advantageously cooled to the abovementioned temperatures by external cooling. In a preferred embodiment, therefore, measure (a) is executed by bringing the polymerization medium to the required low temperature and keeping it there during the polymerization by means of a separate cooling circuit. The separate cooling circuit, which in terms of design is usually implemented as an outer cooling jacket around the polymerization reactor, is generally operated with liquid nitrogen or liquefied air as the coolant.

The polymerization is performed generally at a pressure of 500 mbar to 5 bar, especially at a pressure of 800 mbar to 2 bar. Most advantageously and also most economically viably, the polymerization reactor is operated at or close to ambient pressure (standard pressure). A slightly elevated pressure can bring advantages in the case of some of the possible inert solvents. Even though a mode of operation of the polymerization at elevated pressure is possible in principle, higher pressures, especially those over 5 bar, generally do not bring any additional advantages.

According to measure (b), particular inert solvents or mixtures of such inert solvents are used in the liquid polymerization medium. The term "inert solvents" shall be understood here to mean not just fluids in which isobutene dissolves homogeneously in a liquid phase but also fluids with which isobutene is immiscible and is present in the dispersed form. Suitable inert solvents of this kind are firstly $C_1$ to $C_8$ hydrocarbons, preferably $C_1$ to $C_5$ hydrocarbons, especially $C_2$ to $C_4$ hydrocarbons, which are typically saturated or monoethylenically unsaturated and generally have a linear or lightly branched structure. If they are ethylenically unsaturated, they must not of course themselves polymerize under the reaction conditions of the present invention; they normally have only primary and/or secondary olefinic carbon atoms. Typical examples of such $C_1$ to $C_8$ hydrocarbons are methane, ethane, ethene, propane, propene, n-butane, isobutane, n-pentane, 2-methylbutane, 2,3-dimethylbutane, 2-methylpentane, 3-methylpentane, 3-ethylpentane, 2,2-dimethylpentane, 2,3-dimethylpentane, 2,4-dimethylpentane, 2-methylhexane, 3-methylhexane, 3-ethyl-2-methylpentane, 2,2-dimethylhexane, 2,3-dimethylhexane, 3,3-dimethylhexane, 4-methylheptane, 2,2,3-trimethylpentane and 3-methylheptane. Other suitable inert solvents of this kind are halogenated $C_1$ to $C_8$ hydrocarbons, preferably halogenated $C_1$ to $C_5$ hydrocarbons, especially fluorinated and/or chlorinated $C_1$ to $C_8$ or $C_1$ to $C_5$ hydrocarbons such as methyl chloride, methyl fluoride, difluoromethane, dichloromethane, fluoroethane, 1-fluoropropane, 1,1,1,2,3,3,3-heptafluoropropane, octafluoropropane or 1-fluorobutane; particularly useful here are perfluorinated $C_1$ to $C_8$ or $C_1$ to $C_5$ hydrocarbons or those $C_1$ to $C_8$ or $C_1$ to $C_5$ hydrocarbons in which at least half of the hydrogen atoms have been replaced by fluorine atoms. It is also possible to use mixtures of $C_1$ to $C_8$ or $C_1$ to $C_5$ hydrocarbons, mixtures of halogenated $C_1$ to $C_8$ or $C_1$ to $C_5$ hydrocarbons or mixtures of one or more $C_1$ to $C_8$ or $C_1$ to $C_5$ hydrocarbons and one or more halogenated $C_1$ to $C_8$ or $C_1$ to $C_5$ hydrocarbons.

In a preferred embodiment, as measure (b), the inert solvent used is ethane, ethene, propane, propene, n-butane, isobutane or a mixture thereof.

In an alternative preferred embodiment, as measure (b), the inert solvent used is 1,1,1,2,3,3,3,-heptafluoropropane, octafluoropropane or a mixture thereof.

The weight ratio of isobutene to the inert solvents according to measure (b) in the polymerization reactor is generally 1:0.1 to 1:50, preferably 1:0.1 to 1:40, in particular 0.1:1 to 1:20, especially 1:0.5 to 1:10.

According to measure (d), the polymerization is performed in the presence of one or more reaction accelerators. Such a reaction accelerator is a compound which, under the selected polymerization conditions, influences and thus controls the catalytic activity of the boron trifluoride in the desired manner. Such reaction accelerators are saturated hydrocarbon compounds which comprise at least one oxygen atom, preferably as an ether oxygen atom or as part of a carbonyl function. In a preferred embodiment, as measure (d), the polymerization is performed in the presence of at least one reaction accelerator selected from ketones, aldehydes, ethers, acetals and hemiacetals. Typically, such reaction accelerators are low molecular weight compounds having 1 to 40, especially having 1 to 16 and in particular having 1 to 8 carbon atoms; the structure thereof may be open-chain or cyclic; they may be aliphatic, aromatic or heteroaromatic in nature.

Typical representatives of such reaction accelerators are ketones such as acetone, butanone, cyclohexanone, acetophenone or benzophenone, aldehydes such as formaldehyde, trioxane, paraformaldehyde, acetaldehyde, propionaldehyde, butyraldehyde, benzaldehyde, cyclohexylaldehyde or glyoxal, dialkyl ethers such as dimethyl ether, diethyl ether or di-n-butyl ether, cyclic ethers such as tetrahydrofuran or dioxane, and acetals and hemiacetals which are obtainable by reaction of the abovementioned ketones and aldehydes with alcohols such as methanol, ethanol, n-propanol, isopropanol, n-butanol, isobutanol, sec-butanol or tert-butanol. Very particular preference is given to using formaldehyde as such a reaction accelerator.

The reaction accelerators mentioned can usually be used in an advantageous manner together with one or more medium molecular weight alcohols, especially monohydric aliphatic, cycloaliphatic or araliphatic alcohols, in particular $C_4$ to $C_{10}$ alcohols, e.g. n-butanol, isobutanol, sec-butanol, tert-butanol, n-pentanol, n-hexanol, n-octanol, 2-ethylhexanol, n-decanol, 2-propyiheptanol, cyclohexanol or benzyl alcohol. Firstly, such medium molecular weight alcohols— similarly to the low molecular weight alcohols used as a proton source according to measure (c)—act as activators or moderators in the catalyst complex, but usually with weaker activating action; secondly, they function as solvents for the reaction accelerators. When aldehydes or ketones are used as reaction accelerators, the abovementioned medium molecular weight alcohols, and also some of the low molecular weight alcohols mentioned, can form acetals or hemiacetals or ketals (ketone acetals) therewith, and these likewise act as reaction accelerators. If formaldehyde is used as a reaction accelerator, it is possible to use a corresponding alcoholic solution, e.g. formaldehyde in isobutanol. If medium molecular weight alcohols of this kind are used, the weight ratio thereof relative to the reaction accelerator is generally 0.05:1 to 15:1, but preferably 0.1:1 to 5:1, especially 0.5:1 to 2.5:1, in particular 0.75:1 to 1.5:1.

The reaction accelerator itself is normally used in amounts of 0.0001 to 1% by weight, preferably 0.0003 to 0.75% by weight, especially 0.0005 to 0.5% by weight, in particular 0.001 to 0.1% by weight, based in each case on isobutene used.

According to measure (e), the polymerization is performed in the presence of at least one chain length regulator, which is normally an ethylenically unsaturated system and comprises one or more tertiary olefinic carbon atoms—optionally in addition to one or more primary and/or secondary olefinic carbon atoms. Usually, such chain length regulators are mono- or polyethylenically unsaturated hydrocarbons having 5 to 30, especially having 5 to 20 and in particular having 5 to 16 carbon atoms; the structure thereof may be open-chain or cyclic. Typical representatives of such chain length regulators are isoprene (2-methyl-1,3-butadiene), 2-methyl-2-butene, diisobutene, triisobutene, tetraisobutene and 1-methylcyclohexene. In a preferred embodiment, as measure (e), the polymerization is performed in the presence of isoprene and/or diisobutene as chain length regulators. Diisobutene (isooctene) is typically understood to mean the isomer mixture of 2,4,4-trimethyl-1-pentene and 2,4,4-trimethyl-2-pentene; the individually used 2,4,4-trimethyl-1-pentene and 2,4,4-trimethyl-2-pentene isomers also of course likewise act as chain length regulators according to measure (e). Through the amount of the chain length regulators used in accordance with the invention, it is possible in a simple manner to adjust the molecular weight of isobutene homopolymers obtained: the higher the amount of chain length regulators, the lower the molecular weight will generally be. The chain length regulator typically controls the molecular weight by being incorporated into the polymer chain at an earlier or later stage and thus leading to chain termination at this site.

The chain length regulator is used normally in amounts of 0.0001 to 2% by weight, especially 0.0005 to 1% by weight, in particular 0.001 to 0.5% by weight, based in each case on isobutene used.

The process according to the invention for preparing isobutene homopolymers—including the subsequent workup steps—can be performed batchwise or continuously.

The polymerization reactors used for the process according to the invention may in principle be all batchwise or continuous reactor types suitable for such liquid phase polymerizations, for example stirred tanks, stirred tank cascades, kneaders, extruders, tubular reactors or loop reactors.

It is advantageous to perform the process according to the invention at high conversions, if at all possible at full conversion or near full conversion, for example at a conversion of the isobutene used to the desired product of 85% to 100%, especially of 90% to 100%. However, it is also possible—especially in continuous mode—to perform the process according to the invention with partial conversion, for example at a conversion of the isobutene used to the desired product of 10% to 85%, especially of 30% to 60%. In a preferred embodiment, the polymerization conditions for the process according to the invention are selected such that the isobutene used is converted in the polymerization reactor with a conversion of at least 90%, especially at least 95%, in particular of at least 99%, to isobutene homopolymers having a weight-average molecular weight of 75 000 to 10 000 000.

In an advantageous execution of the process according to the invention, the isobutene feedstock or an isobutenic hydrocarbon mixture is premixed in a separate vessel together with the proton source, especially a $C_1$- to $C_3$-alkanol, and together with one or more reaction accelerators, especially selected from ketones, aldehydes, ethers, acetals and hemiacetals, and/or one or more chain length regulators, especially selected from isoprene and diisobutene, and added in the polymerization reactor to the inert solvent which comprises the boron trifluoride and has been cooled to polymerization temperature. It is also particularly advantageous to cool this mixture prior to addition to the polymerization reactor. This isobutenic mixture is added to the polymerization reactor such that the external cooling allows the desired polymerization temperature to be kept constant. Rapid and complete mixing of the isobutene into the continuous phase is crucial for effective temperature control and hence for the success of the process.

Evaporating nitrogen from the external cooling can then either be liquefied again in a closed circuit or—without needing to undertake purification—passed into the environment. In the case of renewed liquefaction of the recycled nitrogen stream, the low temperature of the evaporated nitrogen can be utilized advantageously and thus recovered. If the recycling is omitted, the refrigeration energy of the gaseous nitrogen can be utilized for other cooling purposes, for example for the cooling of the degassed end product.

As an alternative to liquid nitrogen or liquefied air, it is also possible when working within the range of a polymerization temperature of −100° C. to −150° C. to work with other external coolants, for example based on halogenated hydrocarbons.

The isobutene homopolymers which have a weight-average molecular weight of 75 000 to 10 000 000 and are prepared in the process according to the invention are worked up typically by discharging the product from the polymerization reactor and—optionally after a suitable pretreatment—by thermal purification of the product. The discharge is advantageously effected at very low temperatures. The discharge from the reactor can be undertaken, for example, with the aid of a mechanical discharge device such as a discharge screw. In a preferred embodiment, which is of significance especially in the case of industrial scale execution of the process according to the invention, the isobutene homopolymers obtained in the polymerization reactor are discharged from the polymerization reactor at temperatures of less than −80° C. and subjected to a thermal purification process at temperatures of more than +80° C.

The thermal purification after the discharge of the product from the polymerization reactor is advantageously effected, in the case of industrial scale execution of the process according to the invention, by use of one or more extruders. In this case, the isobutene homopolymers are heated to temperatures of more than 80° C., especially more than 100° C. The mechanical action of the extruder shafts and of any internals in the extruder constantly renews the inner surface for better degassing of the volatile constituents in the product, such as residual monomers and solvents. The degassing and the purification of the product can be facilitated by applying a vacuum; more particularly, a pressure of less than 700 mbar is employed for this purpose, especially of less than 200 mbar and in particular of less than 100 mbar.

It is possible in principle to use all customary single-shaft and twin-shaft and multishaft extruders for the thermal purification of the isobutene homopolymers obtained. In the case of twin-shaft and multishaft extruders, the shafts may work in a corotatory or contrarotatory manner. The shafts in single-shaft and multishaft extruders are normally equipped with kneading and/or conveying elements. These apparatuses are generally self-cleaning. The shaft speeds are generally in the range from 10 to 500, and especially from 15 to 350 revolutions per minute. In a specific design, the shafts may be configured as screw shafts whose channels intermesh and whose internal shaft diameter is preferably constant over the entire length. Preferred construction materials for the extruders described are steels or stainless steels. It is also advantageous to introduce an inert gas, for example nitrogen, into one or more segments of the extruder in order to promote the degassing operation.

The process according to the invention has the advantage that the isobutene homopolymers obtained have only a low solubility in the solvent used (hydrocarbons and/or halogenated hydrocarbons)—and this is especially true at low temperatures—and hence precipitate out substantially in solid form. This precipitated solid has no tendency whatsoever to stick at the low temperatures used, and so the crude product can be discharged and processed further without difficulty since nowhere in the intake region of the product from the reactor into the workup section do temperatures exceed the glass transition temperature of the polymer.

The examples which follow are intended to illustrate the present invention without restricting it.

EXAMPLES 1 TO 12

A 1 liter three-neck flask with mechanical stirrer, inlet tube for dry, gaseous nitrogen for inertization, a thermocouple for temperature monitoring and a coolable dropping funnel was inertized with the aid of liquid nitrogen (in a Dewar flask positioned around the flask) and then cooled to −100° C. Subsequently, 300 ml of liquid propane was initially charged in the flask under a nitrogen atmosphere and 0.1 g of gaseous boron trifluoride was introduced.

The Dewar flask under the flask stood on a height-adjustable lab jack. Variation of the fill level in the Dewar flask allowed the desired polymerization temperature T to be established without difficulty. 94.0 g (1.68 mol) of liquid isobutene were introduced into the dropping funnel cooled with dry ice (approx. −78° C.) or liquid nitrogen (approx. −130° C.). Subsequently, the amounts of methanol, isobutanol, formaldehyde (which had been freshly produced from paraformaldehyde and was present dissolved in the methanol/isobutanol mixture) and diisobutene specified below in each case were metered in and mixed with the isobutene in the dropping funnel.

After the attainment of the desired polymerization temperature T in the flask, the dropwise addition of the dropping funnel contents was commenced while stirring. Each droplet reacted immediately and a fine solid was obtained to an increasing degree. The desired reaction temperature T was kept constant over the entire dropwise addition time by raising or lowering the Dewar flask by means of the jack and adding more liquid nitrogen.

Once the entire dropping funnel contents have been added dropwise, the contents of the flask were allowed to thaw, in the course of which the propane solvent (boiling point: −42° C.) evaporated. Subsequently, the crude product which had become tacky at room temperature was removed and it was freed of the residual solvent by heating in a drying cabinet (temperature: 160° C. at 30 mbar, duration: 2 h). Thereafter, it was possible to determine the analytical data of the isobutene homopolymer obtained.

The table below indicates the temperatures, the amounts used and the analytical data of the products obtained in each case.

| | Example No. | | | | | |
|---|---|---|---|---|---|---|
| | 1 | 2 | 3 | 4 | 5 | 6 |
| Polymerization temp. T | −170° C. | −170° C. | −170° C. | −170° C. | −170° C. | −170° C. |
| Isobutene precooling | −78° C. | −78° C. | −78° C. | −130° C. | −130° C. | −130° C. |
| Amount of methanol | 0.15 ml | 0.15 ml | 0.15 ml | 0.15 ml | 0.15 ml | 0.15 ml |
| Amount of isobutanol | 0.05 ml | 0.05 ml | 0.05 ml | 0.05 ml | 0.05 ml | 0.05 ml |
| Amount of formaldehyde | 0.05 g | 0.05 g | 0.05 g | 0.05 g | 0.05 g | 0.05 g |
| Amount of diisobutene | 0.01 ml | 0.02 ml | 0.05 ml | 0 ml | 0.01 ml | 0.05 ml |
| Molecular weight $M_w$ | 824000 | 796000 | 483000 | 5157000 | 3831000 | 2055000 |
| Molecular weight $M_n$ | 123000 | 117000 | 68000 | 586000 | 421000 | 221000 |
| Polydispersity D | 6.7 | 6.8 | 7.1 | 8.8 | 9.1 | 9.3 |

| | Example No. | | | | | |
|---|---|---|---|---|---|---|
| | 7 | 8 | 9 | 10 | 11 | 12 |
| Polymerization temp. T | −150° C. | −140° C. | −130° C. | −120° C. | −110° C. | −100° C. |
| Isobutene precooling | −78° C. | −78° C. | −78° C. | −78° C. | −78° C. | −78° C. |
| Amount of methanol | 0.15 ml | 0.15 ml | 0.15 ml | 0.15 ml | 0.15 ml | 0.15 ml |
| Amount of isobutanol | 0.05 ml | 0.05 ml | 0.50 ml | 0.50 ml | 0.05 ml | 0.05 ml |
| Amount of formaldehyde | 0.05 g | 0.05 g | 0.05 g | 0.50 g | 0.50 g | 0.50 g |
| Amount of diisobutene | 0.01 ml | 0.01 ml | 0.01 ml | 0.01 ml | 0.01 ml | 0.01 ml |
| Molecular weight $M_w$ | 823000 | 811000 | 803000 | 803000 | 766000 | 715000 |
| Molecular weight $M_n$ | 121000 | 121000 | 110000 | 103000 | 88000 | 73000 |
| Polydispersity D | 6.8 | 6.7 | 7.3 | 7.8 | 8.7 | 9.8 |

The invention claimed is:

1. A process for preparing an isobutene homopolymer having a weight-average molecular weight of 75,000 to 10,000,000, by polymerization of isobutene in the liquid phase in an inert solvent in the presence of a polymerization catalyst based on Lewis acids, which comprises, in a polymerization reactor, at the same time
   (a) performing the polymerization at temperatures of −140° C. to −190° C., (b) using, as an inert solvent, one or more $C_1$ to $C_8$ hydrocarbons or one or more halogenated $C_1$ to $C_8$ hydrocarbons or a mixture thereof and (c) using, a complex of boron trifluoride and a $C_1$- to $C_4$-alkanol as a polymerization catalyst, and additionally (d) performing the polymerization in the presence of at least one aldehyde reaction accelerator, and (e) performing the polymerization in the presence of diisobutene as a chain length regulator, wherein the isobutene polymer obtained in the polymerization reactor is discharged from the polymerization reactor at temperatures of less than −80° C. and subjected to purification by a process consisting essentially of a thermal purification process using one or more extruders at temperatures of more than +80° C.;

wherein an inert gas which is different from said inert solvent is introduced into one or more segments of said one or more extruders; and wherein polymerization is conducted to a conversion of 85 to 100% of isobutene.

2. The process according to claim 1, wherein, as measure (a), the polymerization is performed at temperatures of less than −160° C. to −185° C.

3. The process according to claim 1, wherein measure (a) is executed by bringing the polymerization medium to the required low temperature and keeping it there during the polymerization by means of a separate cooling circuit.

4. The process according to claim 1, wherein, as measure (b), the inert solvent used is at least one inert solvent selected from the group consisting of ethane, ethene, propane, propene, n-butane, isobutane or a mixture thereof.

5. The process according to claim 1, wherein, as measure (b), the inert solvent used is 1,1,1,2,3,3,3-heptafluoropropane, octafluoropropane or a mixture thereof.

6. The process according to claim 1, wherein the polymerization conditions are selected such that the isobutene used is converted in the polymerization reactor with a conversion of at least 90% to isobutene homopolymers having a weight-average molecular weight of 75,000 to 10,000,000.

7. The process according to claim 1, wherein said inert gas comprises nitrogen.

8. A process for preparing an isobutene homopolymer having a weight-average molecular weight of 75,000 to 10,000,000, comprising:

(a) polymerizing isobutene with a conversion of 85 to 100% of isobutene in a polymerization reactor in the liquid phase in an inert solvent in the presence of a Lewis acid polymerization catalyst at a temperature of −140° C. to −190° C., to form the isobutene homopolymer, (b) wherein the inert solvent is one or more $C_1$ to $C_8$ hydrocarbons, one or more halogenated $C_1$ to $C_8$ hydrocarbons or a mixture thereof, and (c) wherein the Lewis acid polymerization catalyst is a complex of boron trifluoride and a $C_1$- to $C_4$-alkanol, (d) wherein the polymerizing is carried out in the presence of at least one aldehyde reaction accelerator, and (e) wherein the polymerizing is carried out in the presence of diisobutene as a chain length regulator, discharging the isobutene homopolymer formed by the polymerizing from the polymerization reactor at a temperature of less than −80° C., thermally purifying the isobutene homopolymer formed by the polymerizing with one or more extruders at a temperature of more than +80° C.;

wherein during the thermally purifying an inert gas which is different from the inert solvent is introduced into one or more segments of the one or more extruders.

9. The process according to claim 8, wherein the polymerizing is carried out at a temperature of −160° C. to −185° C.

10. The process according to claim 8, wherein the polymerizing includes cooling a polymerization medium comprising the isobutene and the inert solvent to a temperature of −140° C. to −190° C. and maintaining the temperature during the polymerizing with a separate cooling circuit.

11. The process according to claim 8, wherein the inert solvent is at least one selected from the group consisting of ethane, ethene, propane, propene, n-butane, isobutane and a mixture thereof.

12. The process according to claim 8, wherein the inert solvent is at least one selected from the group consisting of 1,1,1,2,3,3,3-heptafluoropropane, octafluoropropane and a mixture thereof.

13. The process of claim 1, wherein the polymerization in (c) is a complex of boron trifluoride and at least one of methanol and isobutanol.

14. The process of claim 1, wherein the aldehyde reaction accelerator is formaldehyde.

15. The process of claim 8, wherein the Lewis acid polymerization catalyst is a complex of boron trifluoride and at least one of methanol and isobutanol.

16. The process of claim 8, wherein the aldehyde reaction accelerator is formaldehyde.

17. The process of claim 1, wherein the polymerization in (c) is carried out with a polymerization catalyst that is free of ether.

* * * * *

UNITED STATES PATENT AND TRADEMARK OFFICE
CERTIFICATE OF CORRECTION

PATENT NO. : 9,963,521 B2
APPLICATION NO. : 13/765031
DATED : May 8, 2018
INVENTOR(S) : Thomas Wettling et al.

It is certified that error appears in the above-identified patent and that said Letters Patent is hereby corrected as shown below:

In the Specification

In Column 3, Line 10, delete "trifluorid," and insert -- trifluoride, --
In Column 4, Line 8 (approx.), delete "C1" and insert -- C7 --
In Column 6, Line 57, delete "2-propyiheptanol," and insert -- 2-propylheptanol, --

Signed and Sealed this
Twenty-eighth Day of May, 2019

Andrei Iancu
*Director of the United States Patent and Trademark Office*